United States Patent
Edrich et al.

(10) Patent No.: US 9,976,635 B2
(45) Date of Patent: May 22, 2018

(54) CONTACT GUARD FOR A BELT DRIVE (71) Applicant: Wipotec Wiege- und Positioniersysteme GmbH, Kaiserslautern (DE)

(72) Inventors: Andreas Edrich, Homburg (DE); Markus Wagner, Kaiserslautern (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 0 days. days.

(21) Appl. No.: 15/499,158

(22) Filed: Apr. 27, 2017

(65) Prior Publication Data

US 2017/0314652 A1 Nov. 2, 2017

(30) Foreign Application Priority Data

May 2, 2016 (DE) ........................ 10 2016 108 135

(51) Int. Cl.
| | |
|---|---|
| B65G 41/00 | (2006.01) |
| B65G 39/00 | (2006.01) |
| F16H 7/14 | (2006.01) |
| F16H 7/18 | (2006.01) |
| F16H 7/02 | (2006.01) |
| F16H 7/08 | (2006.01) |

(52) U.S. Cl.
CPC ............. *F16H 7/14* (2013.01); *B65G 41/002* (2013.01); *F16H 7/023* (2013.01); *F16H 7/18* (2013.01); *F16H 2007/0872* (2013.01); *F16H 2007/0891* (2013.01)

(58) Field of Classification Search
None
See application file for complete search history.

(56) References Cited

U.S. PATENT DOCUMENTS

| | | | |
|---|---|---|---|
| 5,170,857 A | 12/1992 | Phillips et al. | |
| 5,246,406 A | 9/1993 | Vahabzadeh | |
| 7,882,944 B1 * | 2/2011 | Eubanks | B65G 13/07 198/790 |
| 8,188,384 B2 * | 5/2012 | Verhaar | G01G 11/003 177/119 |
| 8,304,669 B2 | 11/2012 | Duppre | |

FOREIGN PATENT DOCUMENTS

| | | |
|---|---|---|
| DE | 4111063 A1 | 10/1992 |
| DE | 29621831 U1 | 5/1998 |
| DE | 10247419 A1 | 4/2004 |
| DE | 102005055754 A1 | 5/2007 |
| EP | 0848139 B1 | 6/2002 |

\* cited by examiner

*Primary Examiner* — Kavel Singh
(74) *Attorney, Agent, or Firm* — The Webb Law Firm (57) ABSTRACT

A contact guard for a belt drive, in which a filling space formed between two pulleys and the belt is filled by a filling body, which includes two sub-bodies that can be moved relative to one another.

14 Claims, 6 Drawing Sheets

CONTACT GUARD FOR A BELT DRIVE

CROSS-REFERENCE TO RELATED APPLICATION

This application claims priority to German Patent Application No. 10 2016 108 135.3 filed May 2, 2016, the disclosure of which is hereby incorporated in its entirety by reference.

BACKGROUND OF THE INVENTION

Field of the Invention

The present invention relates to a contact guard for belt drives, which, in spite of good visibility and accessibility of the belt, reliably prevents accidental or even intentional contact with the belt drive.

Description of Related Art

Belt drives are known from different technical sectors and comprise a first pulley, disposed and driven on a first axle, and a second pulley, disposed on a second axle, which is driven by means of a belt that runs around the two pulleys.

The two axles extend parallel to one another in a direction (Y) and are spaced apart from one another in a direction Z that is perpendicular to the former. A third direction X extends perpendicular to the two directions Y and Z.

In such belt drives, different belts (flat belts, V-belts, toothed belts, etc.), alternatively also chains can be used. Between the pulleys (which are supposed to include gear wheels and racks hereinafter), there is a space laterally delimited by circulating belts in what is called an "open" belt drive, in which two axles run parallel, which space is also referred to as filling space R below. Depending on the type of belt and its circulation speed, there is the risk, in this regard, that an object or a part of a human body, particularly a hand or a finger, will get into the filling space in the Y direction. There it could be seized by the belt and pulled in between it and a pulley, and this can result in significant damage and, in particular, physical injury. An opening of the filling space, which opening is sufficiently large to cause this, for example on the inner side of the belt, which opening will be referred to as a "contact gap" hereinafter, is frequently assumed to exist starting from a gap width of 5 mm, wherein the limit can also vary, depending on the application case, or also according to statutory provisions. Such a contact gap must be prevented.

Known solutions provide that the filling space be extensively "filled" after installation of the belt, using a filling body, so that no contact gap can occur. It has proven to be disadvantageous, in this regard, that the filling body must first be removed during a belt replacement, particularly if the distance between the two axles of the pulleys must be reduced for this purpose, and inserted into the filling space again after the belt is installed. In practice, it has furthermore been shown that the known filling bodies, after having been removed, often cannot be properly inserted into the filling space again, because they or their screw connections get lost or simply because time and effort are supposed to be saved. A filling body of the conventional type that remains in the filling space furthermore has the disadvantage that the filling space R increases in size when the axle distance increases in size (for example for tightening the belt), and thereby a gap is produced between the pulleys, which is then no longer filled by the filling body and therefore does not protect against contact.

Other solutions provide for complete encapsulation of the belt instead of a filling body, wherein it is then disadvantageous that the belt can no longer be seen well and cannot be easily checked with regard to its function. Furthermore, the encapsulation must be completely removed in order to replace a belt, and this is time-consuming and therefore expensive.

It was therefore a task of the invention to offer an improved contact guard for belt drives, which does not have to be disassembled for belt replacement or for changing the axle distance of the related pulleys, for example for retightening, for equalization of production tolerances or for setting a bias force, and represents a reliable contact guard at all times, even at varying axle distances, particularly when the belt is tightened.

SUMMARY OF THE INVENTION

This task is accomplished by a belt drive and by a related filling body. The invention is furthermore directed at a transport system having a belt drive as it is used, for example, for transport trolleys, and at a method for belt replacement.

The invention is based on the recognition that a filling body affixed in the filling space R can remain in the filling space even at changeable axle distances and, for example, for belt replacement, and always fills this space, preventing contact, at least when the belt is tightened, if the filling body is formed by at least two sub-bodies configured to be displaceable relative to one another, which cover one another. In this regard, a first sub-body is disposed to be fixed in place relative to the first pulley, while a second sub-body is disposed to be fixed in place relative to the second pulley, so that the two sub-bodies are moved relative to one another when the axle distance is changed. The overlap of the two sub-bodies that is maintained in this regard, according to the invention, ensures, in this regard, that even if the axle distance changes, no gap having the size of a contact gap can occur in the filling space.

The contact guard according to the invention is configured for a belt drive in which a first pulley is disposed on a first axle and drives a belt that runs around a second pulley, which in turn is disposed on a second axle. A filling space R is defined between the pulleys and laterally delimited by the inner side of the belt, which space is filled by a filling body as a contact guard. Protection is provided in that a belt run gap that remains between the filling body and the inner side of the belt is kept below a definable width of a contact gap, which corresponds to the width of a human finger, for example, so that a finger cannot get in between the filling body and the inner side of the belt.

According to the invention, the filling body has a first sub-body that is fixed in place relative to the first pulley, and a second sub-body fixed in place relative to the second pulley, wherein the two sub-bodies are displaceable relative to one another. The displaceability allows temporarily or even repeatedly changing the axle distance between the two pulleys, without the filling body blocking this movement. In this regard, a section of the first sub-body covers a section of the second sub-body in the Y direction. The dimensions of the sections of the sub-bodies that overlap one another are selected in such a manner that the overlap is constantly maintained, independent of the axle distance, so that the filling space constantly remains protected against contact, particularly complete reaching through in the Y direction.

"True" overlap in the sense of the invention exists when the two sub-bodies lie one behind the other with a section, in each instance, in the Y direction, in such a manner that a gap that completely penetrates the filling space in the Y direction does not exist between them. However, because the contact guard would be guaranteed in spite of such a gap, as long as this gap remains smaller than a contact gap, the term "overlap" is also supposed to include this case.

A preferred variant of the invention provides, in contrast, that sections of both sub-bodies lie one behind the other in the sense of "true" overlap in the Y direction.

Because the individual sub-bodies of the filling body are movable relative to one another, they can maintain their fixed-in-place position relative to the respective pulley even when the axle distance changes, for example in order to replace or retighten the belt. Because removal of the sub-bodies is no longer required for this, in contrast to the state of the art, the sub-bodies can remain continuously attached, more or less in captive manner. Maintaining an effective contact guard even after a belt replacement is thereby reliably ensured.

It is practical if the overlap of the two sub-bodies is achieved in that at least one projection of a sub-body dips into at least one depression of the other sub-body. In this variant, the depression encloses the projection on both sides—viewed in the axle direction. Where the projection opens up an additional space or gap (lift gap) when the axle distance is widened, this gap is covered on both sides, in the Y direction, by the side walls of the depression of the other sub-body, as is also clearly evident from the figures. Depending on the axle distance selected, the immersion depth with which the projection of the one sub-body dips into the depression of the other sub-body changes. Because of the overlap of the lift gap on both sides, contact is not possible at any time in this lift gap.

The two runs of the belt, which circulate around the filling space, lie as close as possible to one or more guard sections of the filling body according to the invention with their inner side, in order to keep the gap (belt run gap) that exists between these and the inner belt side smaller than a contact gap. It is practical that such a guard section is formed by means of the projection described above, which can dip into the depression of the other sub-body, according to an advantageous embodiment of the invention. The projection thereby fulfills a dual function, namely forming the overlap of the two sub-bodies in the Y direction, on the one hand, and forming the narrowest possible belt run gap in the X direction between the inner belt side and a sub-body.

According to an advantageous embodiment of the invention, the contact guard is ensured in different ways along each run of the belt, depending on which run section is being considered. Those sections of the belt runs having an inner side that is guided along a guard section with a low distance of the belt run gap are secured against contact in the Y direction specifically by this low belt run gap. In order to permit a change in the axle distance, however, a guard section cannot extend continuously along the entire inner side of a belt run from the first to the second pulley. Instead, formation of the lift gap between the two sub-bodies must be possible, which gap permits relative movement of the two sub-bodies in the Z direction. Because no guard section is formed in the region of the lift gap, and consequently also no sufficiently narrow belt run gap can be formed, it is possible to cover the lift gap and the belt edge laterally in this region. For this purpose, a cover section of a sub-body extends in the Y direction ahead of and behind the lift gap, so far outward in the X direction that aside from the lift gap, the edge of the belt is also covered, and the belt is therefore surrounded on both sides. The contact guard occurs, in this region, in that the lateral surround is formed sufficiently tightly along the belt edge, so that human limbs cannot reach the lateral edge of the belt, in other words no contact gap exists there. Because the lateral cover simultaneously covers the entire lift gap, contact with the inner side of the belt is also prevented.

An advantageous embodiment of the invention provides that at least one sub-body has at least one core section disposed in the filling space, which section is configured for forming one or more guard sections on the inner side of the belt. In the direction of the axles, the core section is covered on both sides by the aforementioned cover sections, which delimit the filling space in the axle direction and also cover a lift gap that exists between the cover sections, if applicable. It is practical if the cover sections extend to beyond the belt edge, in order to surround it laterally.

Preferably, the core section and the cover sections are configured in one piece, in order to reduce the number of parts and to simplify assembly. Polyoxymethylene (POM) has proven to be particularly suitable for producing the sub-bodies. Production can take place, for example, by means of injection-molding methods. This material not only has good processability, but also good electrical conductivity, in order to prevent static charging of the belt and/or of the filling body. Because at least the guard section of a sub-body can stabilize the belt on its inner side as it circulates, also with regard to oscillations and vibrations, and guides it at the same time, the guard section, preferably the entire sub-body, is entirely produced from a material having good sliding properties. These properties are particularly important for transport belts of inspection systems, for example X-ray inspection systems, track-and-trace systems or scales.

The sub-bodies can be attached in the filling space by means of being screwed in, glued in, snapped into place or in another manner known to a person skilled in the art.

Although the belt is sufficiently well secured to prevent contact, by means of the filling body according to the invention, it can be well viewed at all times and can be checked for proper function, at least visually. Because it is possible to do without the encapsulation of the belt as it is known from the state of the art, a part number applied to the belt, for example, can also be easily seen. The belt tension and the status of the belt or of its teeth/links can also be easily checked, and at least partial belt cleaning is also easily possible.

An advantageous field of use for the filling body according to the invention and for a belt drive that uses it exists in the case of transport systems in which a conveyor belt is driven by way of a belt.

In this regard, a motor disposed on a motor chassis drives a first pulley, directly or indirectly, which pulley drives a second pulley, by way of a belt, which pulley in turn is directly or indirectly coupled with a roller that guides or drives the conveyor belt. While the first pulley and the first sub-body are fixed in place relative to one another on the motor chassis, the second sub-body is fixed in place relative to the second pulley on a belt chassis that also carries the conveyor belt.

In a particularly practical embodiment of such transport systems, the distance between the parallel axles of the two pulleys can be changed in that the belt chassis is pivoted relative to the motor chassis. This can be done by way of a pivot axle that connects the two chassis in articulated manner. More complicated pivoting mechanisms, which do not bring about a relative movement of belt chassis and motor chassis in the form of an arc, are conceivable. In such a transport system, the belt chassis assumes a working position relative to the motor chassis, in which position the axle distance of the two pulleys reaches a predeterminable dimension at which the belt experiences sufficient bias. In this working position, a certain lift gap forms between the first and second sub-body of the filling body according to the invention, which gap is secured to prevent contact by means of the cover sections that laterally delimit the filling space. In the region of a joint that exists between the respective lateral cover sections of the sub-body, the contact guard is ensured by means of the guard section that lies opposite the inner side of the belt, with the formation of a narrow belt run gap.

In order to remove or replace the belt, something that is preferably supposed to take place without tools, the method according to the invention provides that the belt chassis be pivoted relative to the motor chassis, from the working position to a release position. In this process, the axle distance between the two pulleys is reduced, with the two sub-bodies of the filling body according to the invention moving toward one another, and the lift gap and the joint that exists between the lateral cover sections becoming smaller. When the two pulleys are brought closer together, the belt loses its tension and can be removed or replaced. When the belt chassis is moved back into the working position, the pulleys, with their related sub-bodies, in each instance, move away from one another, building up the required belt tension, but a contact gap is not formed at any time. Using the filling body according to the invention, belt replacement can take place without tools and in a few seconds, without further components other than the belt itself having to be removed from the transport system.

Such a transport system is particularly used in weighing systems, in which the transport system forms a pre-load for a weighing cell.

The particular advantage of the invention, which does not relate only to the exemplary embodiment shown, lies in that the contact guard formed from the two sub-bodies $K_1$ and $K_2$ permits reduction or expansion of the axle distance—for example in order to replace or tighten the belt—without components of the contact guard having to be removed for this purpose. This relative movement is made possible by means of the second sub-body dipping into the first sub-body, while the two sub-bodies can remain mounted and adjusted on the respective pulley or the related chassis, in a captive and permanent manner, and continuously prevent the formation of a contact gap.

"Belt" in the sense of this application refers to a strand formed into an endless loop, for transfer of a tensile force, wherein the strand can be flexible throughout or can also be formed from individual links that are flexibly connected with one another, as a chain. "Belt drive" therefore also includes chain drives.

BRIEF DESCRIPTION OF THE DRAWINGS

An advantageous embodiment of a contact guard according to the invention will be explained in greater detail below, using an example from the figures. In this regard.

DETAILED DESCRIPTION OF THE INVENTION

Figure 1:
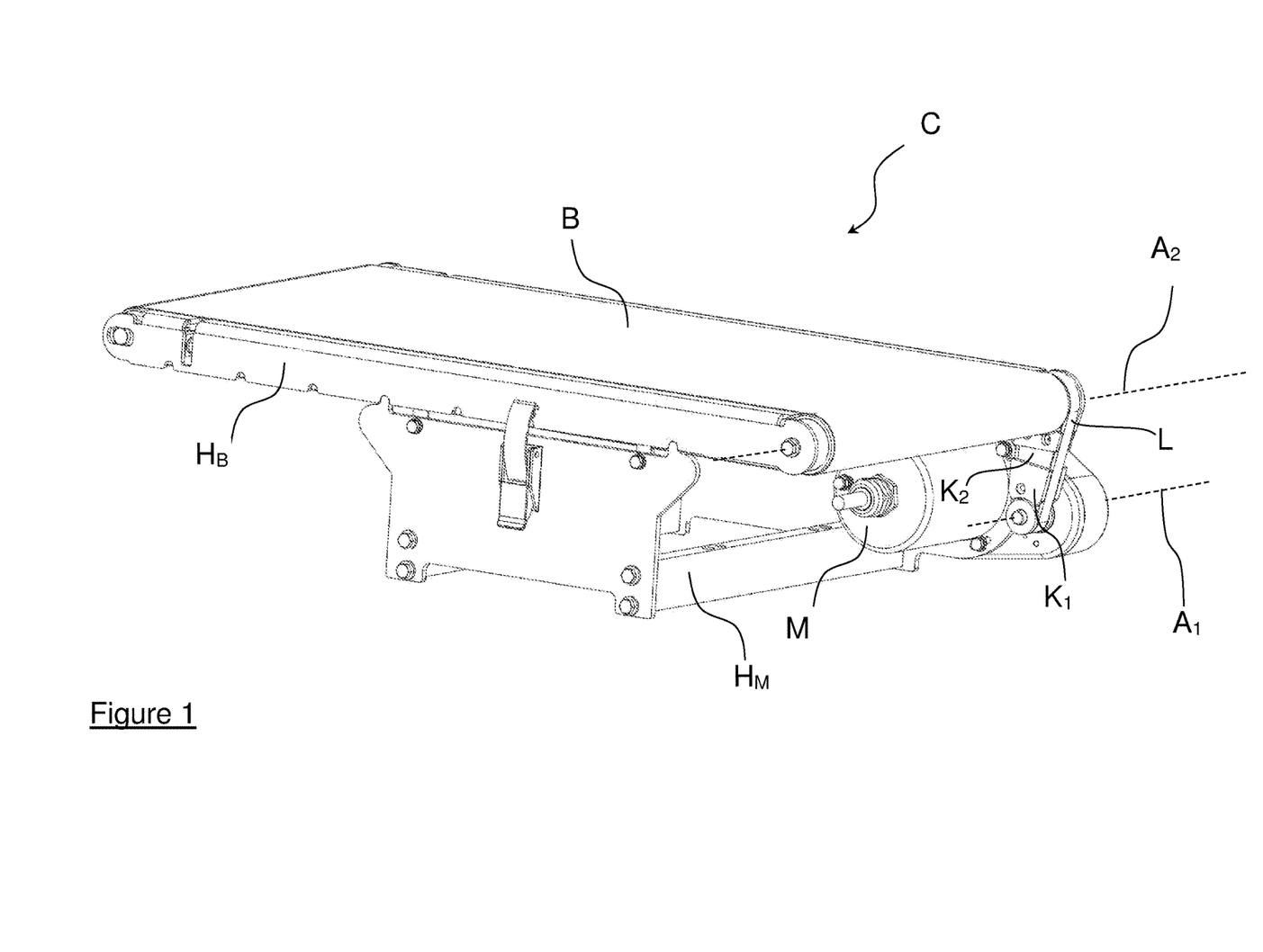
FIG. 1 shows a transport system having a belt drive, in the working position.

FIG. 1, in a perspective view, shows a transport system for use in inspection technology (for example weighing technology, X-ray technology, track-and-trace system). The transport system C comprises a motor chassis $H_M$ and a belt chassis $H_B$ disposed so as to pivot relative to the former. The motor chassis $H_M$ carries a motor M, which drives a first pulley $S_1$ by way of a transmission T indicated in FIG. 2.

The pulley $S_1$ sits on a first axle $A_1$ that runs in the Y direction. The first pulley $S_1$ drives a second pulley $S_2$ by way of a belt L, which pulley sits on a second axle $A_2$ disposed above the first axle $A_1$ in a Z direction, which axle runs parallel to the first axle $A_1$. The second pulley $S_2$ is part of the belt chassis $H_B$ and is coupled with a roller, which in turn drives a conveyor belt B. After release of a quick-release connection, the belt chassis $H_B$ can be pivoted relative to the motor chassis $H_M$ by way of a pivot mechanism, not shown in any detail, in such a manner that the Z distance between the axles $A_1$ and $A_2$ changes during this process. In the working distance shown in FIG. 1, the axle distance is selected in such a manner that the belt L looped around the pulleys $S_1$, $S_2$ is under tension and ready for operation.

Figure 2:
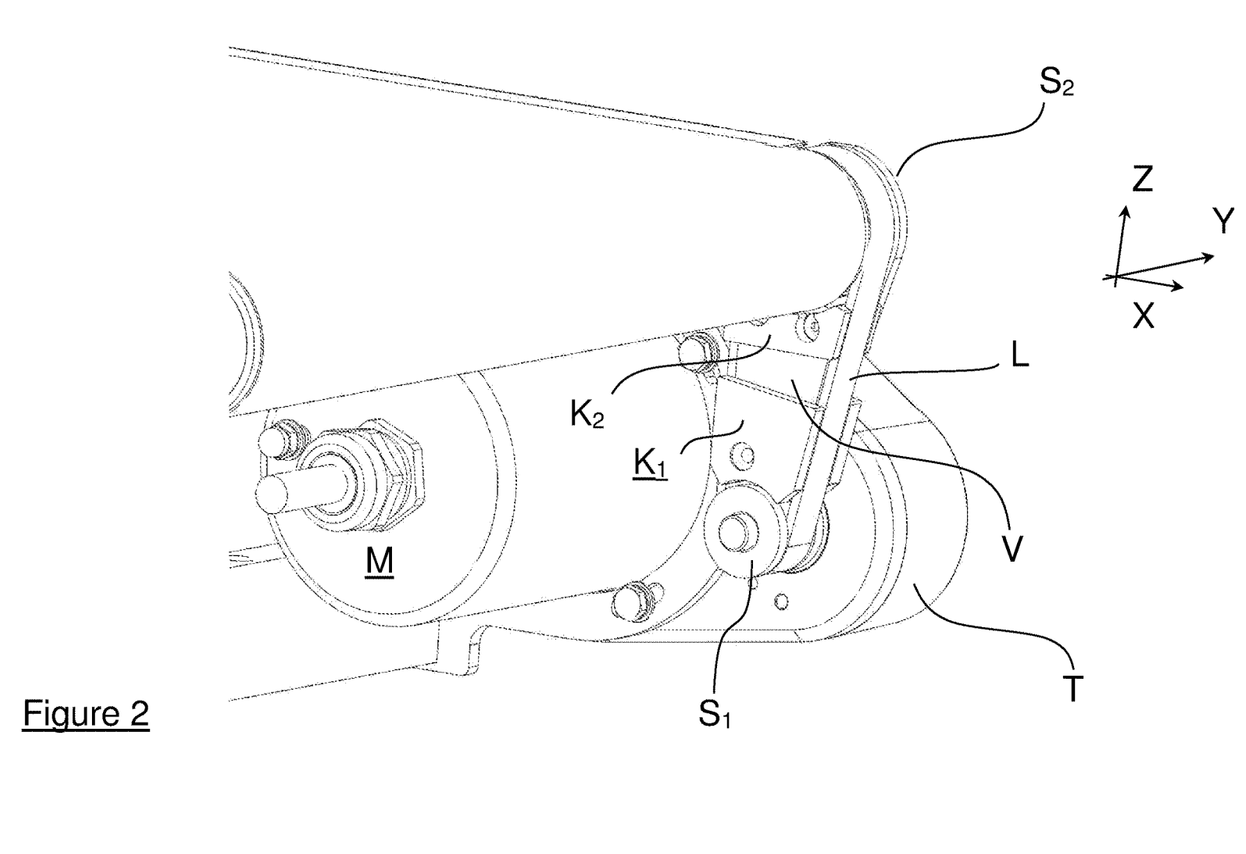
FIG. 2 shows the belt drive of the transport system in an enlarged representation.
Figure 3A:
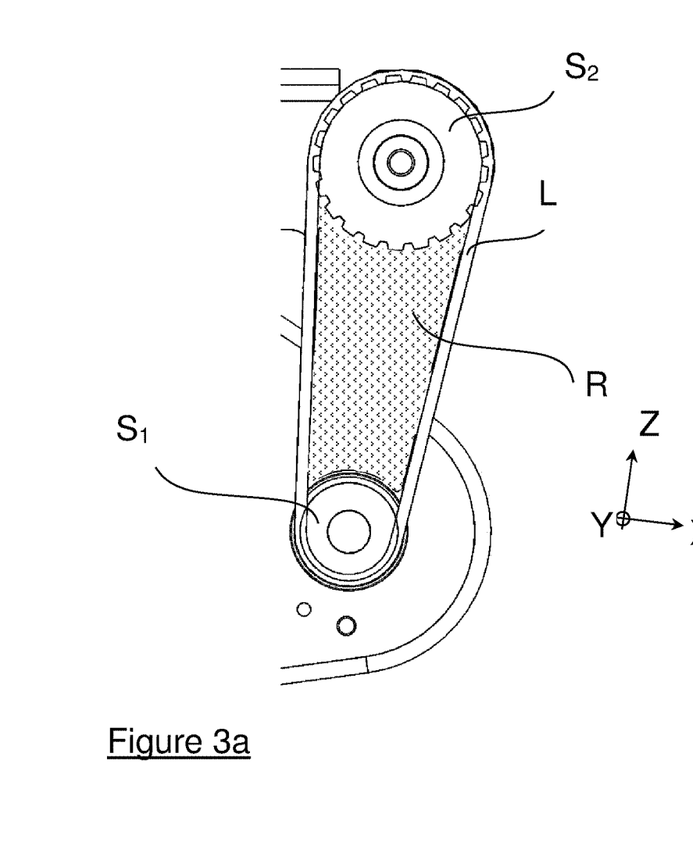
FIG. 3a shows the filling space formed between the pulleys and the belt in a side view.

FIG. 2 shows the belt drive of the transport system from FIG. 1 in an enlarged representation. The first pulley $S_1$ of the motor chassis $H_M$, together with the second pulley $S_2$ of the belt chassis $H_B$ and with the belt L that circulates around the two pulleys, delimits a space that is shown in simplified manner in FIG. 3a, as a filling space R. During operation of the belt drive, objects or human limbs are supposed to be prevented from getting into the filling space R, in order to prevent damage to the drive or injury of an operator.

Figure 3B:
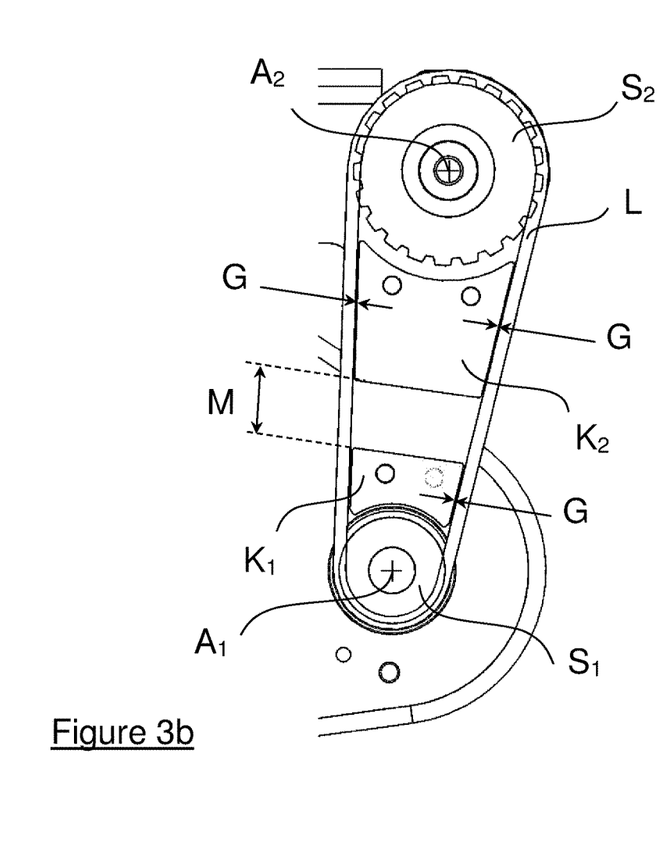
FIG. 3b shows the belt drive in a side view, with sub-bodies inserted.
Figure 4A:
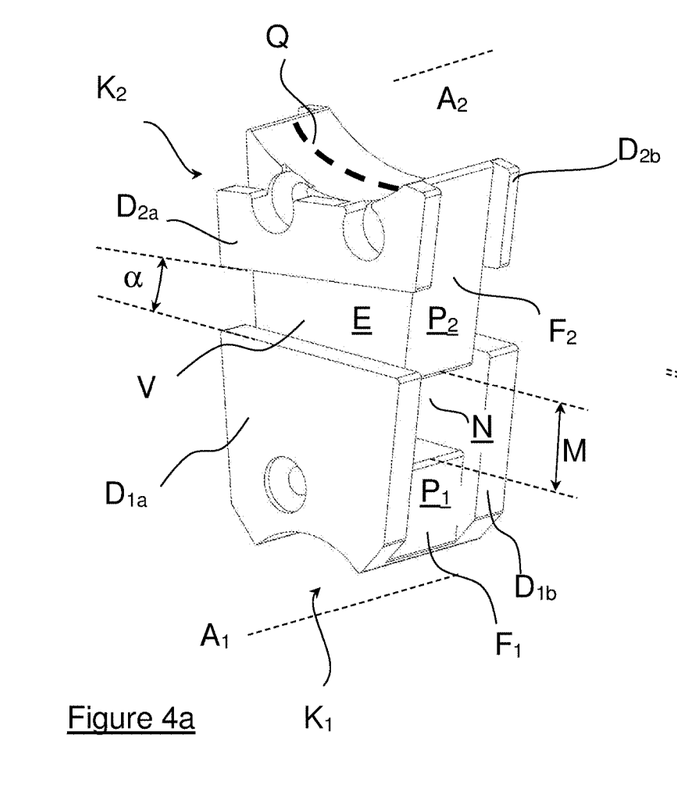
FIG. 4a, 4b show the sub-bodies in different positions relative to one another.

As can be seen in FIG. 2 and in greater detail in FIGS. 3b and 4a, for this purpose two sub-bodies $K_1$ and $K_2$ are positioned in the filling space R, which sub-bodies fill this space to such an extent that unintentional penetration, particularly of human limbs, is reliably prevented. For this purpose, a first sub-body $K_1$ is attached to the motor chassis $H_M$ in the lower part of the filling space R and fixed in place relative to the first pulley $S_1$. A second sub-body $K_2$ is disposed in the upper half of the filling space R and fixed in place on the belt chassis $H_B$ relative to the second pulley $S_2$.

FIG. 3b shows a simplified sectional representation of the placement of the filling bodies $K_1$, $K_2$, with cross-hatching being left out for the sake of clarity. The section plane Q (see FIG. 4) lies at half the belt width and runs through the center of the filling space R. The lower first sub-body $K_1$ lies closely against the circumference or contour of the first pulley $S_1$ and extends slightly in the direction toward the second pulley $S_2$. In this regard, the first sub-body $K_1$ forms a narrow belt run gap G between itself and the inner side of each run of the belt L, which gap is clearly narrower than the thickness of a human finger or of a definable contact gap. The upper second sub-body $K_2$ has a similar structure and lies closely against the contour of the second pulley $S_2$ with its upper end. Furthermore, it extends in the direction toward the first pulley $S_1$ and also forms the narrow belt run gap G between itself and the inner side of the two runs of the belt L.

A lift gap M remains between the two sub-bodies $K_1$, $K_2$, which gap changes as the axle distance $A_1$-$A_2$ changes. In the region of the lift gap M, no body lies opposite the inner side of the belt L. In order to prevent unintentional contact in this region, as well, the first sub-body comprises cover sections ($D_{1a}$, $D_{1b}$), as can be seen in FIG. 4a, for example.

FIG. 4a shows the two sub-bodies $K_1$, $K_2$ in a perspective and non-sectional representation (the section plane Q selected in FIG. 3b is indicated with a broken line). A lower section of the second sub-body $K_2$, configured as a projection V, projects into a depression N with a changeable immersion depth; this depression is formed by a first core section $F_1$ and two cover sections $D_{1a}$, $D_{1b}$ of the first sub-body $K_1$ that lie opposite one another in the Y direction. The projection V is simultaneously part of a core section $F_2$ that belongs to the second sub-body $K_2$. The core section $F_2$ is also laterally surrounded by two cover sections $D_{2a}$, $D_{2b}$ that lie opposite one another in the Y direction. The Y distance of the cover sections $D_{1a}$ or $D_{1b}$ relative to $D_{2a}$ or $D_{2b}$, is selected to be slightly wider, in each instance, than the Y width of the belt L, a short section of which can be seen in FIG. 5b.

Figures 6A, 6B:
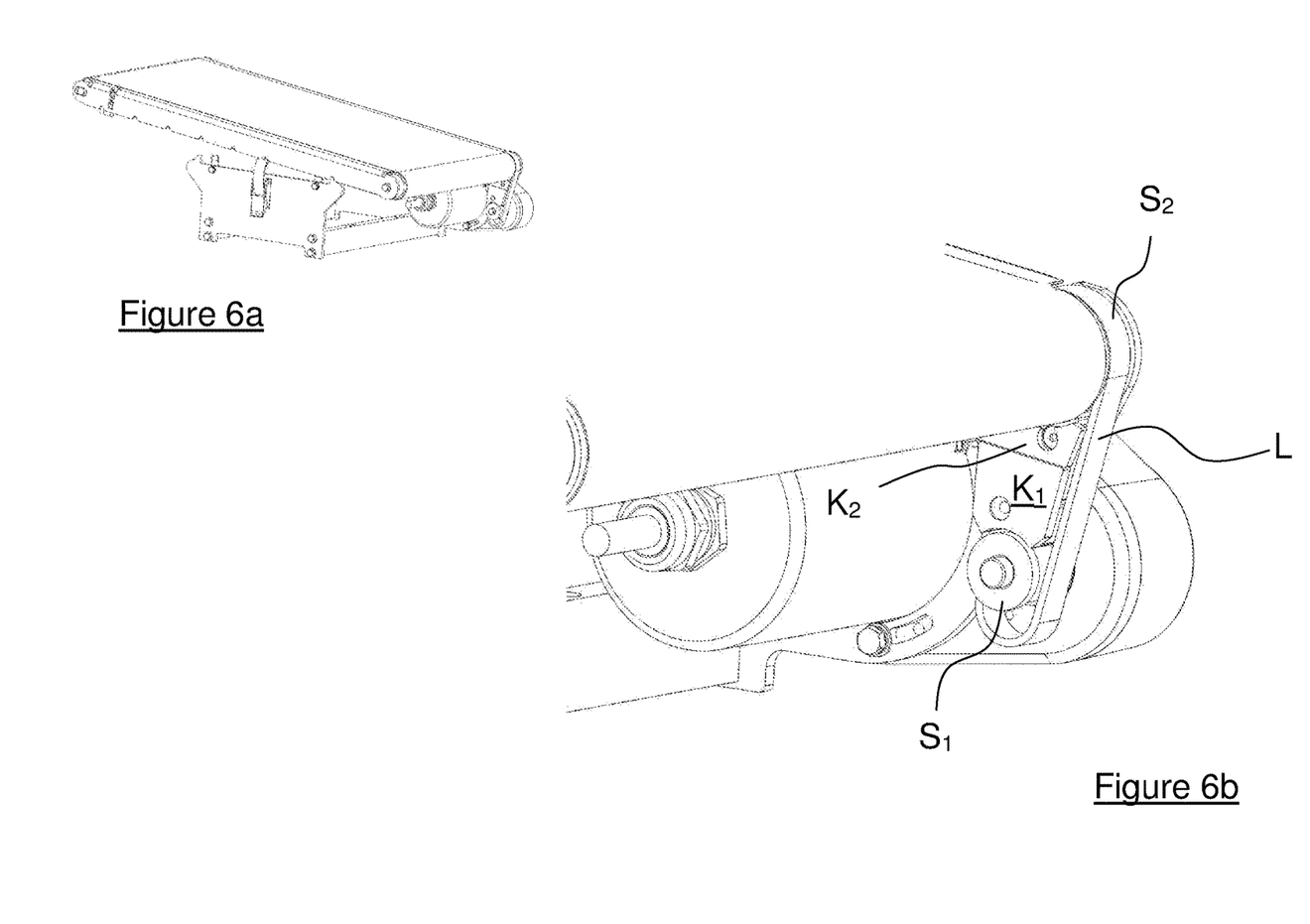
FIG. 6a, 6b show a transport system in the release position, with an enlarged representation of the belt drive.

The placement of the sub-bodies $K_1$ and $K_2$ relative to one another, which can be seen in FIG. 4a, corresponds to the placement shown in FIG. 1 and FIG. 2, in which the belt chassis has assumed the working position and the belt L has the required tension. To release or replace the belt L, the belt chassis—as shown in FIGS. 6a and 6b—is pivoted slightly upward relative to the motor chassis $H_M$, after a quick-release connection that prevents pivoting and can be manually activated was released. In this way, the distance between the axles $A_1$, $A_2$ is reduced. The belt L thereby loses its tension and can be removed from the pulleys $S_1$, $S_2$ and replaced with another belt.

Figure 4B:
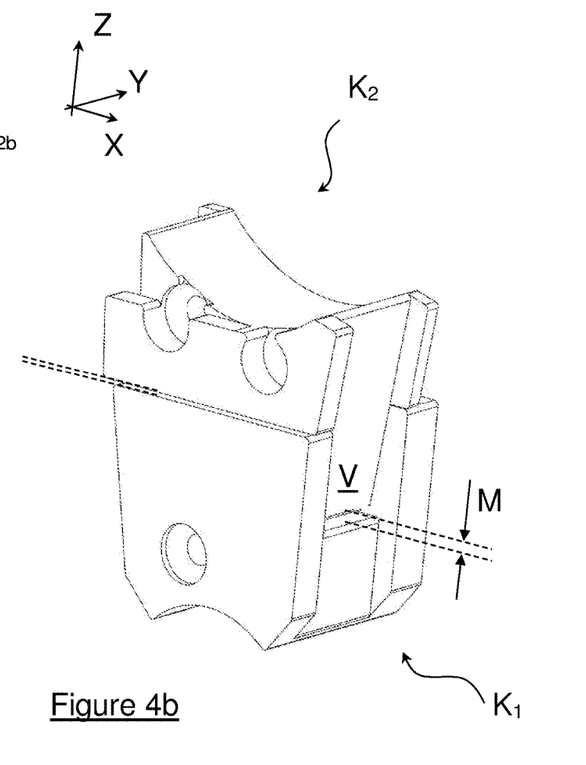

During the reduction of the axle distance, during which the sub-bodies $K_1$, $K_2$, which are fixed in place, in each instance, move toward one another, the projection V of the second core section $F_2$ of the second sub-body $K_2$ dips deeper into the depression N of the first sub-body $K_1$, with the gap height of the lift gap M in the Z direction being reduced. This case is shown in FIG. 4b, where the projection V is completely immersed between the two cover sections $D_{1a}$, $D_{1b}$ of the first sub-body. Because of the pivoting movement of the belt chassis $H_B$ relative to the motor chassis $H_M$, the immersion movement of the projection V into the first sub-body $K_1$ does not take place in purely translational manner, but rather at a pivot angle α. A conical joint E that exists between the lower cover sections $D_{1a}$, $D_{1b}$ and the upper cover sections $D_{2a}$, $D_{2b}$ before immersion is accordingly reduced to a small dimension during immersion.

The belt L, not shown in FIGS. 4a and 4b, is guided between the cover sections $D_{1a}$, $D_{1b}$, $D_{2a}$, $D_{2b}$ and lies closely against the core sections $F_1$ and $F_2$, as indicated in FIG. 2, during operation. The contact guard according to the invention is ensured by means of a combination of two guard mechanisms, in this regard: The core sections $F_1$ and $F_2$ of the first and second sub-body $K_1$ and $K_2$ are configured in such a manner that when the belt is under tension, they extend along the inner side of the runs of the belt L with a guard section $P_1$, $P_2$ and thereby form the narrow belt run gap G. With the exception of the lift gap M, in which the belt cannot be supported in this manner on the inner side, the contact guard is ensured by means of this narrow belt run gap G. The run section that passes over the lift gap M is instead surrounded laterally, at its edge, by the cover sections $D_{1a}$ and $D_{1b}$, so that in this region, too, contact with the belt is effectively prevented.

The cover sections $D_{1a}$ and $D_{1b}$ of the first sub-body $K_1$ are configured in such a manner that they surround the belt L laterally even on the other side of the lift gap M, thereby additionally stabilizing the operation of the belt and further improving the contact guard. Accordingly, cover sections $D_{2a}$ and $D_{2b}$ for laterally surrounding the belt (not shown in FIG. 4a) are also formed on the second sub-body $K_2$.

Figure 5A:
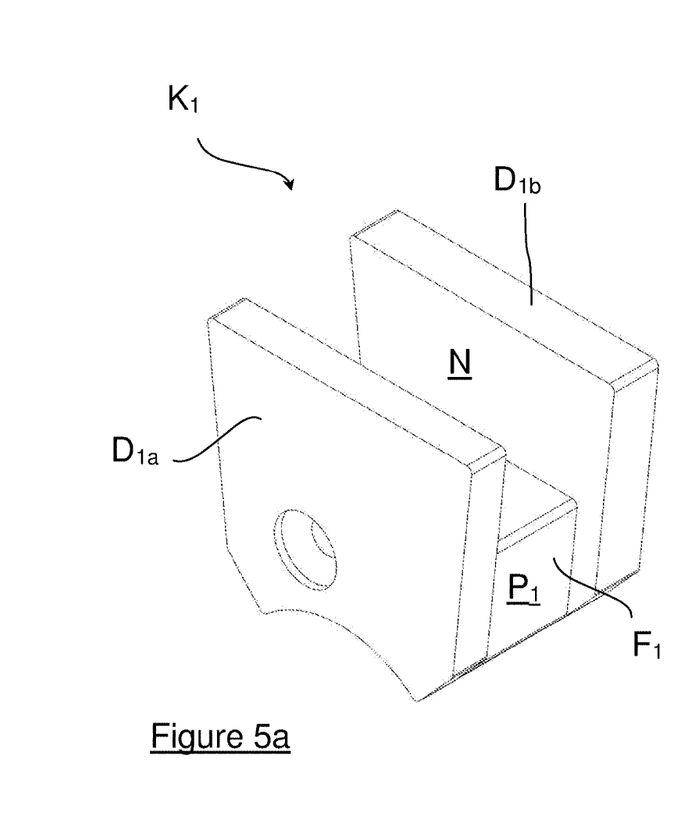
FIG. 5a, 5b show the sub-bodies in a separate representation.
Figure 5B:
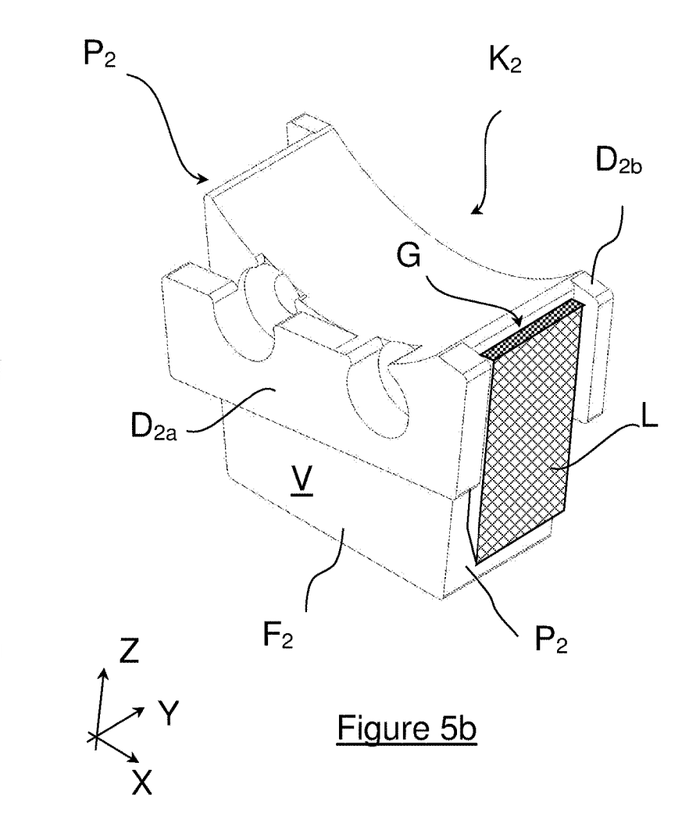

FIGS. 5a and 5b show the sub-bodies $K_1$ and $K_2$ in a separate representation. In this regard, it can be seen how the core section $F_2$ of the second sub-body $K_2$ forms not only the projection V for immersion into the depression N of the first sub-body, but also the opposite guard sections P, which guide the belt L with the narrow belt run gap G. In FIG. 5b, a short section of the belt L is shown lying tightly against a guard section P of the second sub-body $K_2$, with the belt run gap G being formed between guard section P and the inner side of the belt L. Laterally, the belt L is surrounded by the cover sections $D_{2a}$ and $D_{2b}$ of the second sub-body $K_2$, which project laterally slightly beyond the core section $F_2$ for this purpose.

REFERENCE SYMBOL LIST $A_1$, $A_2$ first axle, second axle
$S_1$, $S_2$ first pulley, second pulley
L belt
R filling space
K filling body
E joint
G belt run gap
M lift gap
Q section line
$K_1$, $K_2$ first sub-body, second sub-body
P guard section
V projection
N depression
$D_{1a}$, $D_{1b}$, $D_{2a}$, $D_{2b}$ cover section
$F_1$, $F_2$ core section
C transport system
B conveyor belt
$H_M$ motor chassis
$H_B$ belt chassis
T gear mechanism

The invention claimed is:

1. A belt drive, in which a belt driven by a first pulley disposed on a first axle drives a second pulley, which is disposed on a second axle spaced apart from the first axle in a first direction (Z) and parallel to it, wherein the first axle and the second axle extend in a second direction (Y) perpendicular to the first direction (Z), and a third direction (X) extends perpendicular to the first and second direction (Z, Y),    a) wherein a filling body is disposed as a contact guard in a filling space circumscribed by the first pulley and second pulley and an inner side of the tightened belt, and    b) wherein a width, in the X direction, of a belt run gap that remains between a guard section of the filling body and an inner side of the belt is smaller than a predeterminable dimension and    c) wherein the filling body has a first sub-body that is fixed in place relative to the first pulley, and a second sub-body that is fixed in place relative to the second pulley, and wherein the first sub-body and second sub-body can be displaced relative to one another, wherein d) the first sub-body and the second sub-body form an overlap in the Y direction,
wherein the first sub-body and second sub-body form the overlap in that at least one projection of the second sub-body dips into at least one depression of the first sub-body.

2. The belt drive according to claim 1, wherein a width of the belt in the Y direction is smaller than or equal to
a) a width of the guard section in the Y direction, or
b) a clear distance that exists in the Y direction between two cover sections that surround the belt laterally.

3. The belt drive according to claim 1, wherein the overlap is maintained during a predeterminable change in distance between the first axle and second axle, in that an immersion depth of a projection into a depression and thereby the height, in the Z direction, of a resulting lift gap changes.

4. The belt drive according to claim 1, wherein the guard section is formed at least in part by a projection.

5. The belt drive according to claim 1, wherein at least one section of the filling body surrounds the belt laterally.

6. The belt drive according to claim 1, wherein an inner side of each belt run section of the belt that is under tension is always protected against contact even during and after a change in the distance between the first axle and the second axle, within a predeterminable extent, by at least one of the first sub-body and second sub-body, in that
a) a section of a sub-body laterally covers the belt run section and an adjacent part of the filling space, and/or
b) a guard section of a sub-body forms the belt run gap on the inside of the belt run section.

7. The belt drive according to claim 1, wherein a sub-body has at least one core section disposed in the filling space, which is followed in the Y direction, on both sides, in each instance, by a cover section wherein the cover section delimits the filling space in the Y direction and covers the belt edge, at least in part.

8. A filling body for a belt drive according to claim 1.

9. A transport system comprising a belt drive according to claim 1, wherein the distance between the first axle and the second axle can be reduced for removal of the belt, and can be increased to tighten a belt.

10. The transport system according to claim 9, comprising
a) a motor chassis having a motor, the first pulley, and the first sub-body, and
b) a belt chassis having a conveyor belt, the second pulley, and the second sub-body,
c) wherein the distance between the first axle and the second axle can be changed by means of pivoting the belt chassis relative to the motor chassis.

11. The transport system according to claim 9, wherein the transport system forms a pre-load for a weighing sensor.

12. A method for replacing a belt on a belt drive according to claim 1, comprising the following method steps:
a) reducing the distance between the first axle and second axle in order to reduce a tension of the belt to such an extent that the belt can be removed, without tools, from at least one pulley, wherein the first sub-body and the second sub-body move toward one another, b) replacing the belt,
c) increasing the distance between the first axle and the second axle in order to tighten the belt so as to be ready for operation, wherein
d) the first sub-body and the second sub-body continuously fill the filling space during steps a) to c) in such a manner that the overlap is maintained.

13. The belt drive according to claim 7, wherein the cover section is connected in one piece with the core section.

14. The belt drive according to claim 1, wherein the predeterminable dimension is configured to prevent entry of a human finger into the belt run gap.

* * * * *